April 6, 1965        A. E. AMSTUTZ        3,177,309

MOTOR DRIVEN ROTARY ELECTRICAL STEPPING SWITCH

Filed Sept. 27, 1962        2 Sheets-Sheet 1

ARNOLD E. AMSTUTZ
INVENTOR.

BY *Rines and Rines*

ATTORNEYS

April 6, 1965        A. E. AMSTUTZ        3,177,309
MOTOR DRIVEN ROTARY ELECTRICAL STEPPING SWITCH
Filed Sept. 27, 1962        2 Sheets-Sheet 2

ARNOLD E. AMSTUTZ
INVENTOR.

BY Rines and Rines

ATTORNEYS

United States Patent Office 3,177,309
Patented Apr. 6, 1965

3,177,309
MOTOR DRIVEN ROTARY ELECTRICAL
STEPPING SWITCH
Arnold E. Amstutz, Cambridge, Mass., assignor, by mesne assignments, to Artisan Electronics Corporation, Morristown, N.J., a corporation of New Jersey
Filed Sept. 27, 1962, Ser. No. 226,501
10 Claims. (Cl. 200—23)

The present invention relates to rotary stepping switches and, more particularly, to electrical rotary stepping switches useful in educational computers and similar circuits.

Numerous types of electrically and manually driven stepping switches have been evolved throughout the years for use in relatively complicated and expensive circuits and equipment. Unfortunately, however, the complicated construction and expense of such switches has made it not feasible to incorporate the same inexpensive electrical toys, games or small educational computers, or the like, though the functions of such stepping switches are most useful in such devices. In addition, electrical games, and the like, have requirements for intermediate points of electrical connection and other peculiar needs that the present-day usage of conventional stepping switches do not demand.

It is, therefore, an object of the present invention to provide a new, improved and vastly simplified rotary stepping switch that is sufficiently inexpensive and unsophisticated to enable its ready use with electrical games, educational computers and similar apparatus.

Another object is to provide a novel switch of more general utility, also.

Other objects will become evident in the description hereinafter and will be more particularly pointed out in the appended claims.

In summary, the objects of the invention are attained by a stepping switch comprising an insulating panel provided on one surface with a substantially circular array of electrical contact members, each provided with means for establishing electrical connection thereto from the other opposite surface of the panel. A rotatable contactor is mounted upon a driving disc positioned to enable rotation of the disc to effect successive contact between the contactor and the successive contact members. An electrically operative motor, provided with a driving shaft, is supported by a resilient suspension disposed upon the said one surface of the panel with the driving shaft resiliently urged against a peripheral region of the driving disc. Means is provided, accessible from the said other surface of the panel, for enabling electrical energization and de-energization of the motor, and a manually controllable selector for setting the position of the contactor is disposed at the said other surface of the panel mechanically coupled to the driving disc. Preferred constructional details are hereinafter set forth.

The present invention will not be described in connection with the accompanying drawings in which.

Figure 2:
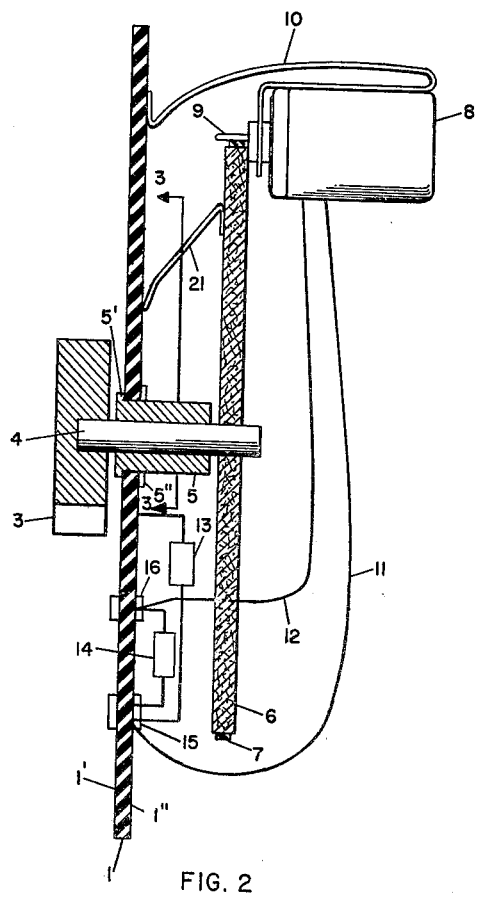
FIG. 2 is a sectional view taken upon the line 2—2 of FIG. 1 showing a preferred drive mechanism.
Figure 3:
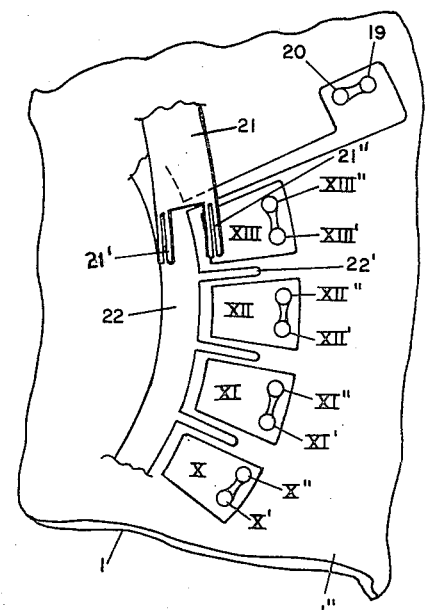
FIG. 3 is a fragmentary view, upon an enlarged scale, taken upon the line 3—3 in FIG. 2.

The rotary stepping switch of the present invention is shown comprising a substantially planar insulating panel 1 provided on its lower surface 1″, FIG. 3, with a substantially circular array of separated electrical contact layers or members, four of which, labelled X through XIII, are illustrated. Each of the electrical contact members X, XI, XII, XIII, etc., is provided with double eyelet or similar terminal means, identified by single and double prime notations, such as X′ and X″ in connection with the contact member X, for establishing electrical connection thereto from the upper or opposite surface 1′ of the panel. A rotatable contactor 21, FIGS. 2 and 3, is mounted at an intermediate point of a planar driving disc 6, disposed in a plane below but parallel to the panel 1, and rotatable about the shaft 4, that is mounted within a bearing 5 supported by a flange 5′ and a washer 5″ upon the panel 1, to effect successive contact between the contactor 21 and the successive contact members X, XI, etc. during rotation of the disc 6. A flat annular contact strip 22 is also disposed upon the lower panel surface 1″, substantially concentrically within the array of contact members X, XI, etc. for a purpose later explained. The contact strip 22 is provided with substantially radial extensions 22′ disposed between successive contact members X, XI, etc., and the contactor 21 engages the strip 22, as well as the successive contact members X, XI, etc.

Figure 1:
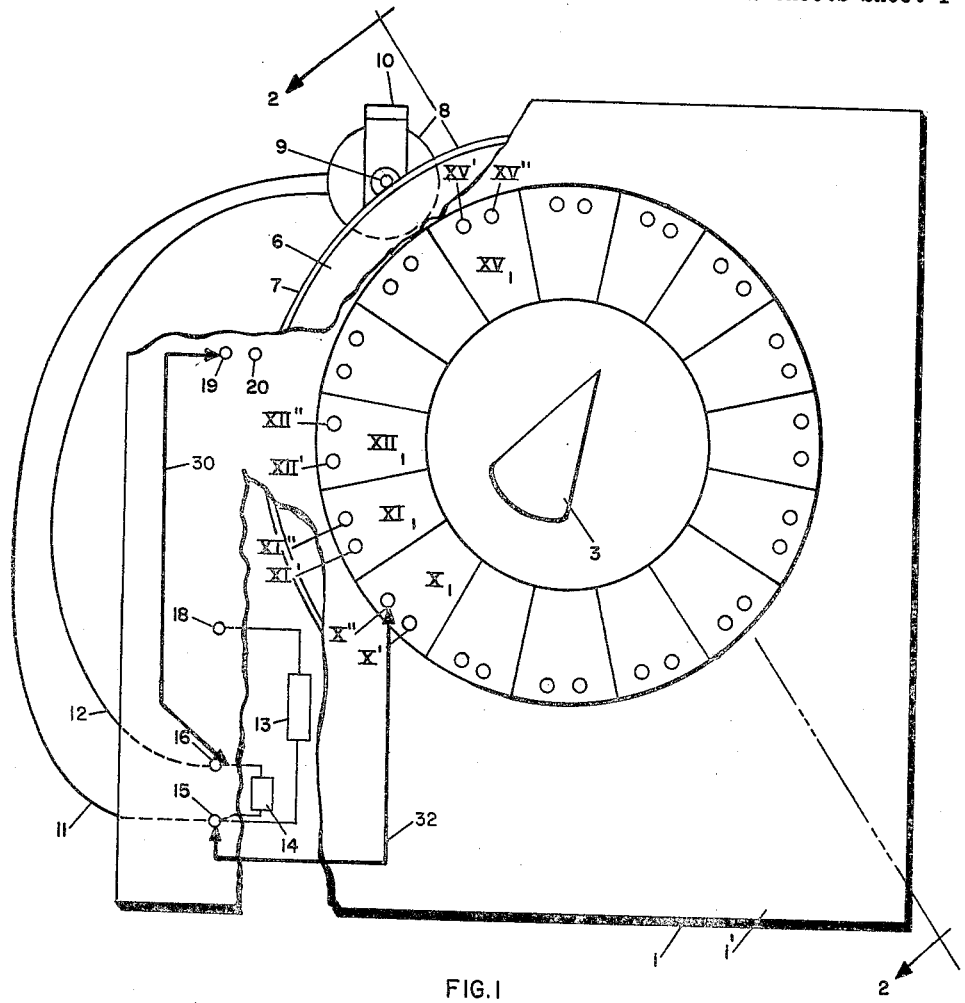
FIG. 1 is a front view, partially cut away, of a rotary stepping switch constructed in accordance with a preferred embodiment of the present invention.
Figure 4:
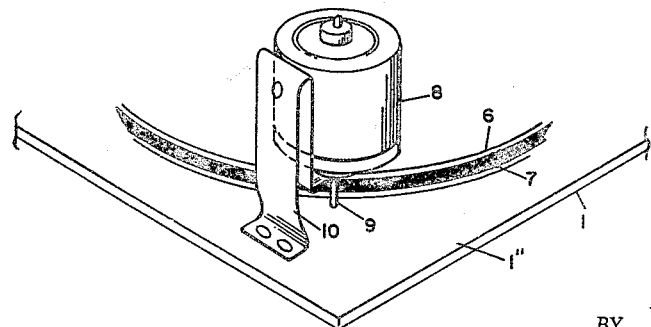
FIG. 4 is a fragmentary view, in perspective, of the electric motor and resilient suspension and drive of the system of FIGS. 1 through 3.

The disc 6 is rotated by an electric motor 8, FIGS. 1, 2 and 4, resiliently suspended at 10 from the surface 1″, with the motor shaft 9 urged into engagment with a rubber or other resilient grommet 7 secured to the periphery of the disc 6. The grommet 7 introduces sufficient friction to enable the shaft 9 to effect rotation of the disc 6 upon energization of the motor 8. The motor 8 is a low inertia device that tends to stop quickly, so that the shaft 9 also serves to brake the disc 6. The frictional drive and resilient suspension above-discussed, is not only far less expansive and less complicated than conventional gear and other present-day stepping switch drives (the disc being readily formable from Masonite or similar material and the suspension 10 being merely resilient sheet steel or the like), but it allows a positive, dependable driving action with low-cost battery-operable motors and the like and is self-compensatory in adjustment with wear. Manual movement of the disc 6, by rotation of the shaft 4 through turning of an indicator or pointer knob 3 disposed on the other side 1′ of the panel 1, is also readily effected with this construction, which is necessary in the utilization of this device with games and similar apparatus.

Figure 5:
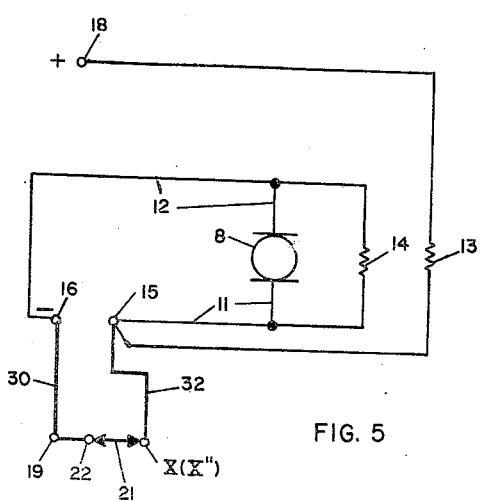
FIG. 5 is a circuit diagram illustrating the operation of the switch.

The electric motor 8 may be energized by connecting any desired source of power to terminals 16 and 18, FIGS. 1 and 5. Current will then pass through a series resistor 13 to a terminal 15 and thence by a conductor 11 to the winding of the motor 8, the circuit being completed by way of a conductor 12 back to terminal 16. A resistor 14 is connected in parallel with the winding of the motor 8 to dissipate energy from the motor in effecting rapid stopping of the same.

In accordance with the game or educational computer or other similar uses of the stepping switch of the invention, the motor 8 may be stopped by external pre-set connections to cause the contactor 21 to stop at a particular contact member X, XI, etc. As an example, the external application of conductors 30 and 32, FIGS. 1 and 5, between respective terminals 19–16 and 15–X″ will insure that the motor 8 will stop the rotation of the contactor 21 at the contact member X, in view of the short circuiting of the motor 8 in that position, shown in FIG. 5. The pointer 3 will then indicate the sector X which may be appropriately identified by an indicia or graduation $X_1$ upon the front panel surface 1′, FIG. 1. Similar indicia for the other sectors are provided.

It is desirable when solving some problems to be able manually to effect rotation of the contactor 21, as before explained. This is done by manually revolving the pointer 3 to the predetermined sector.

Since the contactor 21, FIG. 3, not only engages the annular strip 22 by the member 21' but rides outside the same at 21" to engage the successive contact members X, XI, etc., smoother operation is attained as a result of the intermediate extensions 22' of the strip 22 that reduce the area of circuit breaking during rotation of the contactor 21.

Modifications of the present invention will occur to those skilled in the art and all such are considered to fall within the spirit and scope of the invention as defined in the appended claims.

What is claimed is:

1. An electrical stepping switch having, in combination, an insulating panel provided on one surface thereof with a substantially circular array of electrical contact members provided with means for establishing electrical connection thereto from the other opposite surface of the panel, a rotatable driving member mounted for relative rotation with respect to said insulating panel, a contactor mounted upon a rotatable driving member positioned to enable rotation of the member to effect successive contact between the contactor connected thereto and the successive contact members on said insulating panel, electrically operative motor means provided with a driving shaft, means connected to said one surface of the panel for carrying the motor means and resiliently urging the driving shaft of said motor in frictional driving relationship against a peripheral region of the driving member, means accessible from the said other surface of the panel for enabling electrical energization and de-energization of the motor means, and manually controllable means for setting the position of the contactor disposed at the said other surface of the panel and mechanically coupled to the driving member.

2. An electrical stepping switch having, in combination, an insulating panel provided on one surface thereof with a substantially circular array of electrical contact members provided with means for establishing electrical connection thereto from the other opposite surface of the panel, a driving member connected to one side of said insulating panel for relative rotation with respect thereto, a contactor mounted upon a rotatable driving member positioned to enable rotation of the member to effect successive contact between the contactor and the successive contact members, electrically operative motor means provided with a driving shaft, a resilient suspension connected to said one surface of the panel for carrying the motor means and resiliently urging the driving shaft thereof against a peripheral region of the driving member in frictional driving relationship therewith, means accessible from the said other surface of the panel for enabling electrical energization and de-energization of the motor means, and manually controllable means for setting the position of the contactor disposed at the said other surface of the panel and mechanically coupled to the driving member.

3. An electrical stepping switch having, in combination, an insulating panel provided on one surface thereof with a substantially circular array of electrical contact members provided with means for establishing electrical connection thereto from the other opposite surface of the panel, said other surface having indicia representative of each of the contact members, a rotatable driving disc coaxially disposed with respect to said insulating panel for relative rotation thereto, a contactor mounted upon a rotatable driving disc to enable rotation of the disc to effect successive contact between the contactor and the successive contact members, electrically operative motor means provided with a driving shaft, a resilient suspension disposed upon the said one surface of the panel carrying the motor means and resiliently urging the driving shaft thereof in frictional engagement against a peripheral region of the driving disc, means accessible from the said other surface of the panel for enabling electrical energization and de-energization of the motor means, and manually controllable means for setting the position of the contactor disposed at the said other surface of the panel and mechanically coupled to the driving disc.

4. An electrical stepping switch having, in combination, an insulating panel provided on one surface thereof with a substantially circular array of electrical contact members provided with means for establishing electrical connection thereto from the other opposite surface of the panel, a rotatable driving disc coaxially disposed with respect to said insulating panel for relative rotation thereto, a contactor mounted upon a rotatable driving disc to enable rotation of the disc to effect successive contact between the contactor and the successive contact members, electrically operative motor means provided with a driving shaft, a suspension disposed upon the said one surface of the panel carrying the motor means and resiliently urging the driving shaft thereof in frictional engagement against a peripheral region of the driving disc having a resilient grommet secured thereto, means accessible from the said other surface of the panel for enabling electrical energization and de-energization of the motor means, and manually controllable means for setting the position of the contactor disposed at the said other surface of the panel and mechanically coupled to the driving disc.

5. An electrical stepping switch having, in combination, an insulating panel provided on one surface thereof with a substantially circular array of electrical contact members provided with means for establishing electrical connection thereto from the opposite surface of the panel, a rotatable driving disc coaxially disposed with respect to said insulating panel for relative rotation thereto, a contactor mounted upon a rotatable driving disc and opposite said contacts to enable rotation of the disc to effect successive contact between the contactor and the successive contact members, an electric motor provided with a driving shaft, a suspension disposed upon the said one surface of the panel carrying the motor and resiliently urging the driving shaft thereof in frictional engagement against a peripheral region of the driving disc, means accessible from the said other surface of the panel for enabling electrical energization and de-energization of the motor, a pair of electrical resistors one in series and the other in parallel with the motor, switch means for by-passing the motor and the parallel resistance, and manually controllable means for setting the position of the contactor disposed at the said other surface of the panel and mechanically coupled to the driving disc.

6. An electrical stepping switch having, in combination, an insulating panel provided on one surface thereof with a substantially circular array of electrical contact members each provided with means for establishing electrical connection thereto from the opposite surface of the panel, said opposite surface having indicia representative of each of the contact members, a rotatable driving disc coaxially disposed with respect to said insulating panel for relative rotation thereto, a contactor mounted upon a rotatable driving disc and opposite said contacts to enable rotation of the disc to effect successive contact between the contactor and the successive contact members, electrically operative motor means provided with a driving shaft, a suspension disposed upon the said one surface of the panel carrying the motor means and resiliently urging the driving shaft thereof in frictional engagement against a peripheral region of the driving disc, means accessible from the said other surface of the panel for enabling electrical energization and de-energization of the motor means, and pointer means for setting and indicating the position of the contactor disposed at the said other surface of the panel and mechanically coupled to the driving disc.

7. An electrical stepping switch having, in combination, an insulating substantially planar panel provided on one surface thereof with a substantially circular array of electrical contact members each provided with means for establishing electrical connection thereto from the opposite surface of the panel, a circular driving disc connected in spaced relationship to one side of said panel and in parallel relationship thereto, a contactor mounted upon a circular driving disc and positioned opposite said contacts to enable rotation of the disc to effect successive contact between the contactor and the successive contact members, electrically operative motor means provided with a driving shaft, a suspension disposed upon the said one surface of the panel carrying the motor means and resiliently urging the driving shaft thereof into frictional engagement against a peripheral region of the driving disc, means accessible from the said other surface of the panel for enabling electrical energization and de-energization of the motor means, and manually controllable means for setting the position of the contactor disposed at the said other surface of the panel and mechanically coupled by shaft means to the center of the driving disc.

8. A stepping switch as claimed in claim 1 and in which a further circular contact strip is provided upon the said one surface for engagement also with the contactor.

9. A stepping switch as claimed in claim 8 and in which the further contact strip is of annular configuration.

10. A stepping switch as claimed in claim 8 and in which the further contact strip is provided with substantially radial extensions disposed between successive contact members.

References Cited by the Examiner

UNITED STATES PATENTS

| | | | |
|---|---|---|---|
| 1,811,465 | 6/31 | Geloso | 248—20 |
| 2,707,731 | 5/55 | Backus | 200—24 |
| 2,951,667 | 9/60 | Wise | 248—15 |

BERNARD A. GILHEANY, *Primary Examiner.*
ROBERT K. SCHAEFER, *Examiner.*